May 8, 1928. 1,669,135
K. L. KITHIL
SEISMO VIBROMETER
Filed Dec. 21, 1925 2 Sheets-Sheet 2

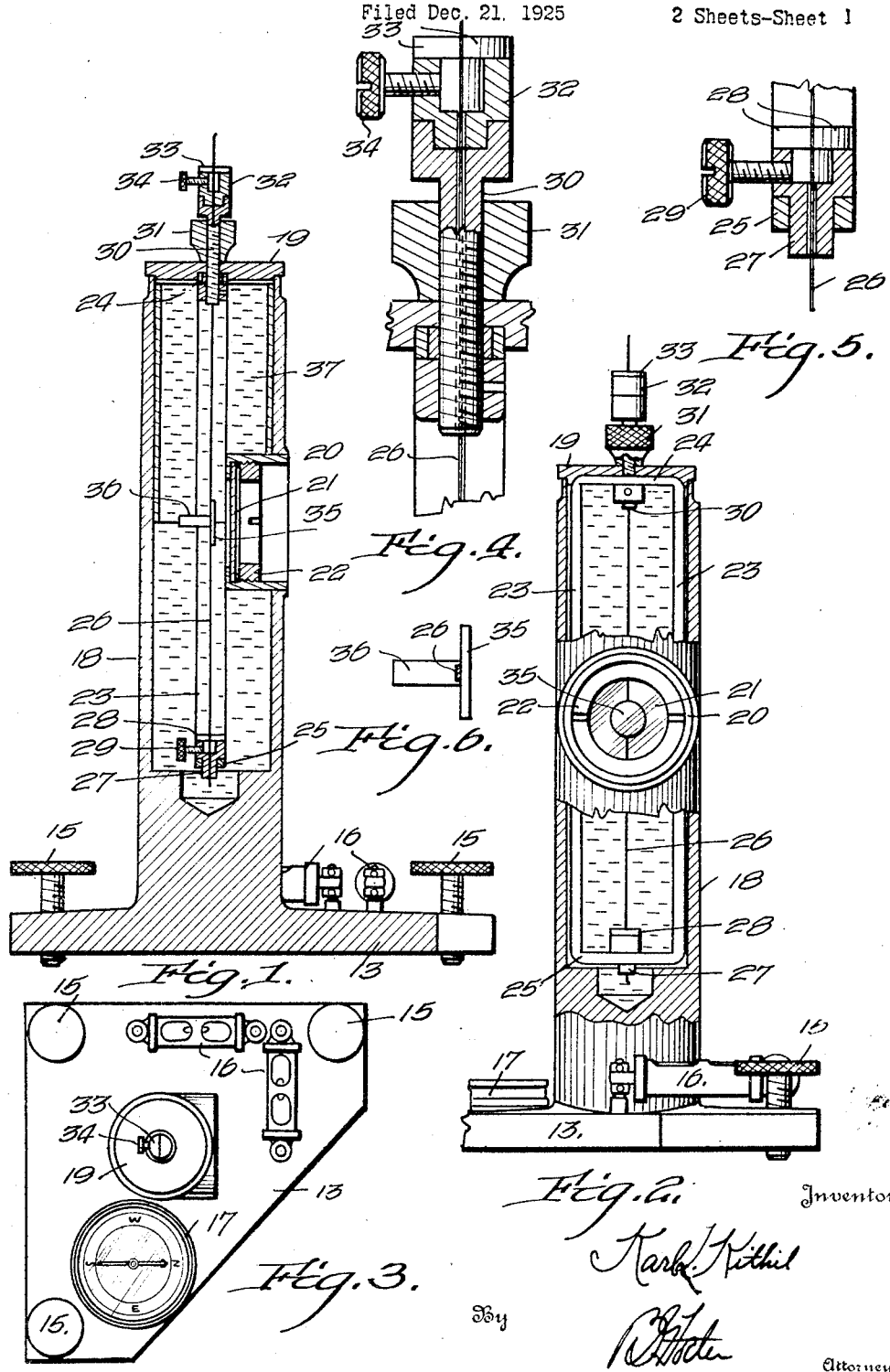

Inventor
Karl L. Kithil
By
Attorney

Patented May 8, 1928.

1,669,135

UNITED STATES PATENT OFFICE.

KARL LUDWIG KITHIL, OF DENVER, COLORADO.

SEISMO-VIBROMETER.

Application filed December 21, 1925. Serial No. 76,916.

The present invention relates to apparatus for indicating or determining vibrations whether caused by natural phenomena or by artificial means through human agency.
The primary object is to provide mechanism that is exceedingly responsive to any vibrations or tremors whether created at a distance or at relatively near points, this mechanism moreover being extremely accurate, and while delicate in the sense of responsiveness, is at the same time of a strong mechanical character, so that it can be readily transported, and set up at any desired point, thereby making it really portable.
An embodiment of the invention that is at present considered the preferable one, is illustrated in the accompanying drawings, wherein:—

Figure 1 is a vertical sectional view through the instrument,

Figure 2 is a vertical sectional view at right angles to Figure 1,

Figure 3 is a plan view,

Figure 7:
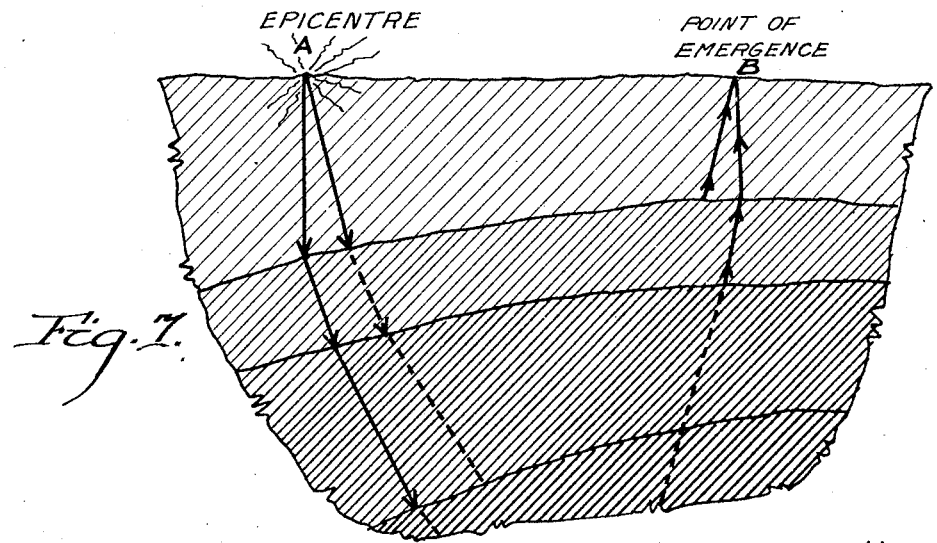
Figure 8:
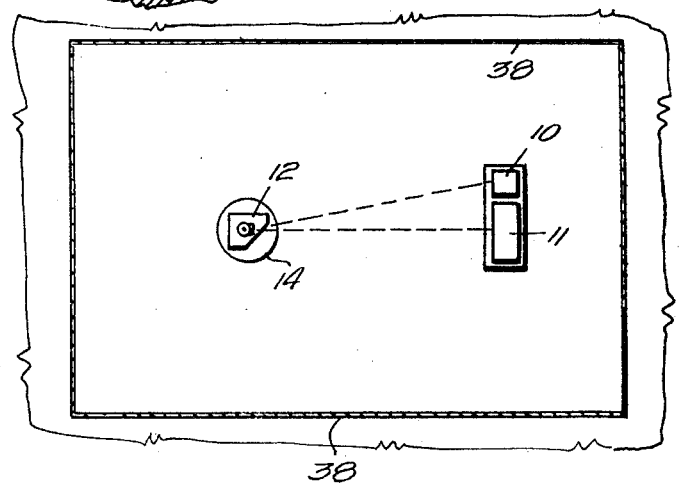
Figure 9:
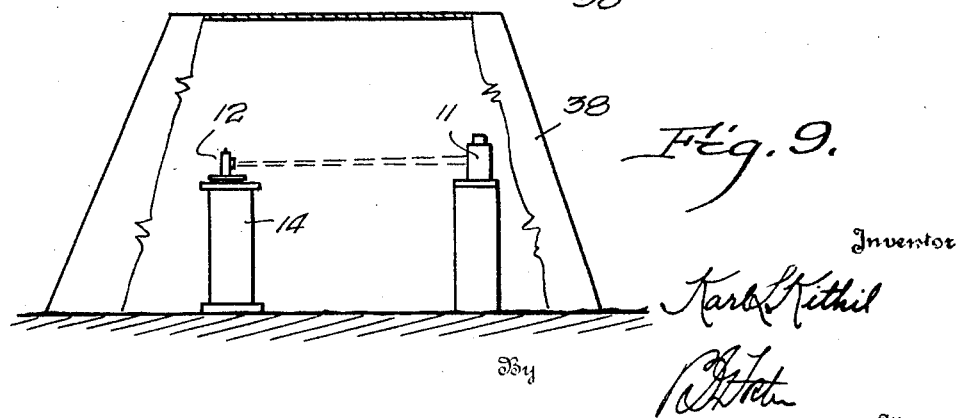

Figure 4 is a vertical sectional view on an enlarged scale of the means for adjusting and putting tension on the torsional element, Figure 5 is a similar view of the holding means for the lower end of the torsional element, Figure 6 is a top plan view of the mirror and pendulum, showing the torsional element in section, Figure 7 is a diagrammatic view indicating a means and method of creating artificial vibrations, Figure 8 is a plan view showing the instrument set up in connection with the recording means, Figure 9 is a side elevation of the same showing the enclosure partially in section.

Referring first to Figures 8 and 9, there is illustrated diagrammatically a suitable means 10 for emitting a pencil of rays of light and a recording means 11 that receives and makes of record such rays of light. This pencil of light is transmitted to an instrument, designated 12, that receives the pencil of light from the emitting means 10 and reflects it to the recorder 11. The instrument 12 provides means whereby the ray of light is caused to move under the impulse of vibrations transmitted to the instrument 12, so that the record made will show such vibrations. This combination, as thus broadly outlined, is well known to the art, and in so far as the light producing means 10 and the recording mechanism 11 is concerned, any form of apparatus may be employed. The present invention relates more particularly to the means for reflecting the pencil of rays and changing its path according to the character of vibrations to which the instrument 12 is subjected.

In Figures 1–6 inclusive is shown the preferred form of construction. A suitable base 13 is provided that is adapted to be placed upon any suitable support, as for instance, a standard 14, shown in Figures 8 and 9. This base may be generally triangular in form, as illustrated in Figure 3, and at its corners is provided with foot screws 15, by which it can be properly leveled. It is also preferably provided with angularly disposed spirit levels 16 and may have a compass 17 thereon. Rising from the base is a tubular, preferably cylindrical, casing 18 having a closed bottom and covered by a removable cap 19. The casing is provided in one side with a window. The frame of this window preferably is in the form of a circular sleeve 20, and into said sleeve is fitted a transparent glass 21 held in place by a threaded tubular plug 22. This window is suitably packed to be liquid-tight.

Detachably suspended from the cap 19 and hanging within the tubular casing is a carrier frame, consisting of side bars 23 connected by end heads 24 and 25. Extending longitudinally within the carrier frame and centrally behind the window is a torsional element. This torsional element preferably comprises a flat ribbon or strand 26. Its lower end extends through a plug 27 secured to the lower head 25, and in this plug is a two-part clamp 28 that grips the lower end of the strand 26, the parts being forced thereagainst by a set screw 29. The upper end of the strand 26 passes through a screw 30 mounted in the cap 19 and having an adjusting nut 31 screwed thereupon and bearing against the upper face of the cap. The upper end of this screw 30 has a head 32. in which is fitted a two-part clamp 33 that grips the upper end of the strand 26, being made operative by a set screw 34.

Secured midway to the front side of the torsional strand 26 and located centrally behind the window is a reflector in the form of a mirror 35. Secured to the rear side of the strand and centrally of the mirror, is a laterally extending preferably horizontal weight 36 that constitutes a pendulum.

The casing is preferably filled with a transparent damping liquid 37. While any suitable material may be employed, liquid paraffin, preferably that put upon the market and known as "Nujol" has been found most satisfactory.

It will be evident that the instrument is a relatively simple one that can be transported, easily set up and adjusted with respect to the light-emitting means 10 and recording mechanism 11. The entire outfit, for example, may be located within a light-excluding tent 38, as shown in Figures 8 and 9, thus making the apparatus peculiarly desirable for field work, though obviously it may be set up in buildings or other places where it is desired to secure a record of vibrations. In field work it may be utilized to record artificially created vibrations. For instance, referring to Figure 2, in order to determine underground conditions the apparatus may be set up at one point and an explosion created at another point. Thus considering the point of the explosion, as A, known as the "epicentre" and the instrument set at B, or the point of emergence, earth tremors or vibrations caused at A by an explosion will be transmitted through the earth, and due to the density and resiliency of the underlying strata, these vibrations, emerging at B, will be varied by the character of the underlying material, and will be recorded by the instrument.

As shown in the detail Figures 1–6 inclusive the device is not only very simple, but there are no frictional elements, electrical damping devices, which have proven unsatisfactory for the purpose, or the like, the mirror being so supported that it can move with respect to the casing without creating any friction, and being immersed in the liquid, has its movements properly dampened. Adjustment is also readily obtained. Thus the tension of the torsional strain can be readily altered by turning the adjusting nut 31, and the position of the mirror can be changed by turning the head 32 so as to cause a partial rotary movement of the mirror.

From the foregoing it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In apparatus of the character set forth, the combination with a tubular casing having an open top and a window in one side, of a closure for the open top, an open frame carried by the top and removably located in the casing, said frame including a lower cross bar and spaced side bars, a torsional strand extending between the top and cross bar longitudinally in the casing and behind the window and between the side bars, a reflector carried by the strand behind the window, and a pendulum element carried by the strand and located within the casing, said pendulum having its center of mass at one side of the axis of the strand.

2. In apparatus of the character set forth, the combination with a tubular casing having an open top and a window in one side, of a closure for the open top, an open frame carried by the top and removably located in the casing, said frame including spaced side bars and a lower cross bar connecting the lower ends of the side bars, a torsional strand extending between the top and cross bar longitudinally in the casing between the side bars and behind the window, means on the closure for longitudinally tightening the strand, and for also rotating it, a reflector carried by the strand behind the window, and a pendulum element carried by the strand and located within the casing, said pendulum having its center of mass at one side of the axis of the strand.

3. In apparatus of the character set forth, the combination with a base having an upstanding tubular casing provided with an open upper end and a window in one side, of a removable closure for the open top, a yoke frame suspended from the closure and comprising spaced side bars extending downwardly into the casing on opposite sides of the window, a torsional strand extending between the closure and the lower end of the frame between the side bars and behind the window, a reflector carried by the strand and located behind the window, a pendulum carried by the strand and outstanding therefrom on the opposite side to the reflector with its center of mass at one side of the axis of the strand, and damping liquid in the casing in which the pendulum is submerged.

In testimony whereof, I affix my signature.

KARL LUDWIG KITHIL.